United States Patent Office 2,835,584
Patented May 20, 1958

2,835,584

COMPOSITIONS OF MATTER

Adolf Rosenberg, Forest Hills, N. Y.

No Drawing. Application March 4, 1955
Serial No. 492,793

8 Claims. (Cl. 99—7)

This invention relates to feeds; and in particular is directed to (a) a novel combination of fatty materials for feed supplementation, (b) a novel feed comprising feeds supplemented with two types of fatty materials which in combination impart to the feed all the nutritional advantages inherent in fats as a major food stuff, and (c) the process of effectuating said supplementation.

There is a growing tendency to supplement feeds with fats. Such supplementation was first stimulated to a practical extent as result of economic pressure in the meat packing industry to dispose of mounting stocks of inedible tallows and greases. During 1954 about 2½ billion lbs. of such products were produced in the United States.

The basic consideration that motivates the poultry or cattle raiser to use fats in animal feeding is the high energy content of fats. However, the fat has to compete price-wise with the cheapest non-fat source of energy, i. e., the corn (carbohydrate rich) component of the ration. Good quality corn contains 3.5 calories per gram, whereas fats contain 9 calories per gram. That high caloric value, coupled with the fact that fats are 90–95 percent digestible, whereas corn is only 80 percent digestible, makes fats worth about three times that of corn as a feed ingredient. As long as the price of fats does not exceed that ratio, fats will be employed in feeds.

Another advantage arising from the use of fats as supplements of feeds is the improved appearance of the feed. The fat is incorporated in feed by spraying liquefied fat on the feed to produce a final product of improved color (richer-looking) and free of objectionable dust.

The low-cost fats available for use as such feed supplements are the inedible tallows and greases. Since those low-cost fats lack natural antioxidants, the manufacturers or producers (feed or primary producers) supplement them with antioxidants to attain a minimum A. O. M. value of 20 hours (the time required for a fat, when aerated at 98° C., to attain a peroxide value of 100 milliequivalents per kg. of fat) [King et al., Oil and Soap, vol. 10, pp. 105–109 (1933)].

The value of fat supplements has been established by practical feeding studies. Improvement in appearance of the feeds is readily noted, and improved feed efficiency is demonstrable. The term "feed efficiency" is defined as: the ratio of the number of lbs. of feed consumed to the number of lbs. of animal produced. Improvement in feed efficiency, i. e., a reduction of the aforesaid ratio, is generally noted, but it is of a small order of magnitude since it merely reflects the somewhat higher caloric value of fat-supplemented feeds being used at present. Under current practices only 2–4 percent of fat are added to the feed. With such small supplements, the caloric value of the feed is increased by only 3–6 percent.

In reviewing this new development in the feed industry, I have noted that it is no more than the result of the expediency mentioned above, i. e., the result of activity of the meat packers to dispose, at the most profitable price, excessive quantities of low-grade fat products for which no market of adequate size has heretofore existed. That surplus fat is not being selected or used in such a way as to make full use of the potential nutritional value of fats. Fats are much more than a concentrated source or form of energy—see Deuel, Non-Caloric Functions of Fat in the Diet, Journal of American Dietetic Association, vol. 26, p. 255 (1950). Fats are a natural vehicle for the fat-soluble vitamins in that they contribute to the stability of those vitamins both in vitro and in vivo, and facilitate absorption thereof from the gastro-intestinal tract. Fats are the sole source of the essential fatty acids, the units of the fat molecule which must be furnished preformed to the animal body.

The low cost fat furnished today to the feed industry is tallow. This fat has a melting point of 43°–48° C. and an iodine value of 32–45. This fat contains no fat-soluble vitamins A, D or E. Since it lacks natural antioxidants, it has poor stability unless supplemented with phenolic-type antioxidants. Even when so supplemented, as for example, with 0.02 percent of butylated hydroxy anisole, it is still a relatively poor medium for furnishing the fat-soluble vitamins in stable form.

It is to be noted that there is a limited value in adding fat-soluble vitamins to antioxidant-supplemented tallow and spraying such a fortified tallow onto feeds. It has been shown (U. S. Patent No. 2,496,634, Melnick) that a fat must possess a minimal melting point of about 52° C. when used as the vehicular material for vitamin A. When a fat has a minimal melting point of 52° C., it lends itself to the formation of discrete particles which can be distributed in the feed and there remain in the described particulate form. When the fat, even of such high melting point (i. e., as compared to that of tallow) containing vitamin A, is mixed in the molten state into soya meal so that the fat with the vitamin A dissolved therein coats the particles of the meal, the vitamin A retention is markedly reduced. I have found that vitamin A dissolved in tallow (M. P. of 46° C. and supplemented with 0.02 percent of butylated hydroxy anisole) is not adequately stabilized in feeds following the spraying of the molten solution at 55° C. in a concentration of 3 percent onto the feeds. When the thus-fortified feed is stored at 45° C. under circulating air, the vitamin A losses were about 50 percent. The vitamin A was determined by the chromatographic antimony-trichloride test as reported by Schaeffer, Journal of the Association of Official and Agricultural Chemists, vol. 33, p. 16 (1950).

It is also to be noted that tallow is virtually deficient in the polyunsaturated fatty acids. Of these polyunsaturated acids, linoleic, linolenic and arachidonic acids are essential. Qualitatively these essential fatty acids are interchangeable. If these essential fatty acids are absent from the diet, chicks grow poorly and fail to survive a period of more than four weeks [Reiser, Journal of Nutrition, vol. 42, p. 319 (1950)]. The mere supplementation of the ration with a fat, such as tallow, deficient in the essential fatty acids is completely ineffective in protecting the chicks. It is also to be noted that the essentiality of polyunsaturated fatty acids for normal growth and development of young calves has been demonstrated [Lambert et al., Journal of Nutrition, vol. 52, p. 259 (1954)].

The reason for the failure to note the deficiency in essential fatty acids of tallow when used in practical feeding operations of farm animals, I now realize, arises from the fact that the feeds heretofore used contained residual vegetable oils, oils which are rich in essential fatty acids. For example, soya bean oil contains about 7 percent oil linolenic and about 52 percent linoleic acid; cotton seed oil contains about 46 percent of linoleic acid; corn oil—about 50 percent linoleic acid; and peanut oil—about 23 percent of linoleic acid. In the past, when the residual meals, remaining after removal of the vegetable oils, have been employed in feeds, sufficient vegetable oil still remained therein to provide protection against fatty acid deficiency. However, that picture has been undergoing change during the past few years and will likely worsen in the future.

During the past few years, the vegetable oil industry has been resorting increasingly to solvent extraction rather than expeller or hydraulic processing in order to increase the yields of vegetable oil. The industry has moved in this direction because of the fact that there is a ratio of at least 4 to 1 and even as much as 6:1 for the price obtainable for the regular oil as compared with the price obtainable for the residual meal sold to the feed industry. The residual vegetable oils in the meals have, unknowingly, been responsible for the absence of essential fatty acid problems of poultry and cattle raisers. Formerly, soya bean meal produced by the expeller process was the feed ingredient. This meal contains 6 percent of soya bean oil. Today solvent-processed soya bean meal is the feed ingredient; and this meal contains only 1 percent of residual soya bean oil. The soya bean oil industry today has been converted almost 100 percent into solvent extraction. Under that stimulus, the processors of cotton seed have done likewise [Brewster, Journal of American Oil Chemists' Society, vol. 31, p. 618 (1954)]. Processors of other vegetable oils are studying this more efficient production technique. As a result of this change in processing having as its object the extraction of the greatest possible amount of oil from seeds and grains, there has been a reduction in the vegetable oil content of feeds from a former level of about 5 percent to the present level of about 3 percent which borders on the critical limit in supplying essential fatty acids.

Another factor which has made the present level of vegetable oils and feed critical is the current practice of improving feeds to obtain increased growth rates and feed efficiencies in farm animals. An increase in the amount of protein and the better quality thereof (as by replacing soya for corn), in rations, vitamin $B_{12}$ and methionine supplementation of feeds, and increased usage of antibiotics, contributes substantially to more rapid growth and feed efficiency of farm animals. It is known that under conditions of rapid growth, the requirements for all of the essential nutrients are increased. However, these new developments in the compositions of feeds have coincided with a decreasing intake of the essential fatty acids. Supplementation of feeds with tallow cannot compensate for the diminution in the essential fatty acids supplied by the ration.

A parallel condition exists with respect to the vitamin E content of feeds. This fat-soluble vitamin is an essential nutrient for every species of animal studied, including farm animals. Up to the present time, the feed industry, without being aware of the fact, has depended upon residual vegetable oil in feeds for supplying vitamin E. Vegetable oils are rich sources of vitamin E (the tocopherols), present in an amount of 160 mg. per 100 grams of soya bean oil or corn oil, and 100 mg. per 100 grams of cottonseed oil. In view of the progressively decreasing concentrations of vegetable oils in feeds coinciding with the progressively increasing growth rates and feed efficiencies, the adequacy of feeds in supplying amounts of vitamin E is now suspect. Tallow contains practically no tocopherols (about 1 mg. per 100 grams), and therefore, cannot be relied upon to correct the present tendency toward reduction in the vitamin E content of feeds when increased intakes of this vitamin are actually necessary.

Accordingly, it is among the primary objects of this invention to provide feed manufacturers and raisers of farm animals with two types of fatty materials which not only constitute a concentrated source of energy and control dustiness in feeds, but in combination impart to the feeds all the nutritional advantages inherent in fats, to wit, provide an excellent source of the essential fatty acids, provide an excellent stabilizing vehicular material for the fat-soluble vitamins A, D, E and K, provide an excellent source of vitamin E, and further provide an excellent medium for promoting absorption of the fat-soluble vitamins from the gastro-intestinal tract.

It is another object of this invention to supply feed manufacturers and raisers of farm animals with two types of fatty materials which in combination impart to feeds all the nutritional advantages inherent in fats, using low-cost by-products of edible oil industries as the source of the basic components.

A still further object of this invention is to provide feeds that are supplemented with two types of low-cost fatty materials which in combination impart to feeds all the nutritional advantages inherent in fats.

An additional object of this invention is to provide a process for treating feeds with two types of low-cost fatty materials which in combination impart to feeds all the nutritional advantages inherent in fats; and also to control dustiness in feeds.

As a result of extended investigations of low-cost by-products, I have discovered a combination of two types of fats which make it possible to impart to feeds all the nutritional advantages inherent in fats. Neither of the said by-products alone is adequate as a supplement for low-fat feeds, i. e., feeds containing less than 1 percent of natural residual fat.

As a source of the essential fatty acids required for the ration and which provides for controlling dustiness in any feeds, I used "acid oil," a by-product of the vegetable oil industry. That by-product constitutes one of the two types of fat mentioned above. As the other type of fat, I used hydrogenated animal fat of feed grade quality in which there has been dissolved "hot well oil," another by-product of the vegetable oil industry. This second type of fat constitutes the vehicular material for stabilizing fat-soluble vitamins, and at the same time constitutes an excellent source of vitamin E. Both of the aforesaid types of fat are concentrated sources of energy, furnishing 9 calories per gram.

Acid oil is the material obtained by the acidulation of the soap stock that accumulates in the alkali refining of vegetable oils. The acid oil, drawn off the surface of the acidified mixture, is liquid at room temperature, bitter in flavor and dark brown to black in color. It is sold to soap manufacturers as a low-cost source of fatty acids. Table I sets forth analyses of a variety of acid oils, the analyses being carried out by conventional test methods.

TABLE I

*Analyses of acid oils*

| Oil Source | Moisture, Percent | Insoluble, Percent | Iodine No. (Wijs) | Saponification No. | Total Fatty Acids,[1] Percent | Free Fatty Acids, Percent | Black (Oxidized) Acids, Percent |
|---|---|---|---|---|---|---|---|
| Soybean: | | | | | | | |
| Range | 1.3-2.2 | | 121-129 | 190-197 | 92-96 | 67-76 | 1-5 |
| Average | 1.8 | 0.1 | 125 | 194 | 94 | 71 | 3 |
| Cottonseed: | | | | | | | |
| Range | 0.9-1.4 | | 103-107 | 193-213 | 91-94 | 59-67 | 2-6 |
| Average | 1.2 | 0.1 | 105 | 203 | 93 | 63 | 4 |
| Peanut: | | | | | | | |
| Range | 0.8-1.3 | | 90-98 | 191-196 | 94-96 | 67-73 | 1-5 |
| Average | 1.1 | 0.1 | 94 | 194 | 95 | 70 | 3 |
| Corn: | | | | | | | |
| Range | 1.4-2.2 | | 115-119 | 186-192 | 91-93 | 53-61 | 2-6 |
| Average | 1.8 | 0.1 | 117 | 189 | 92 | 57 | 4 |

[1] Including unsaponifiable material.

Preliminary tests indicated that acid oil in amounts of from 1 to 3 percent on poultry feeds controls dustiness. Since fats are hydrolyzed in part to free fatty acids during digestion, the caloric value of the acid oil is assured. However, it was expected that these acid oils would be either devoid, or contain insignificant quantities, of essential fatty acids in view of the fact that essential fatty acids are polyunsaturated fatty acids which are very susceptible to oxidation giving rise to decomposition products. Moreover, it is known that free fatty acids are more readily oxidized than the parent triglycerides. When crude vegetable oils are received at the vegetable oil refinery, they are of variable age, up to two years. In the refining process, the free fatty acids in the crude vegetable oils are washed out therefrom in the form of soaps. These soaps are accumulated, and the accumulation thereof then treated with acid. The resulting acid oils liberated from the soap accumulate until they are sold to soap manufacturers. Such extended periods of accumulation spell ample opportunity for the oxidation of the free polyunsaturated fatty acids in the several stages aforesaid, to wit, in the crude vegetable oils, in the soap stocks, and in the acid oils. Indeed, the detection of black oxidized acids in every sample of acid oil is excellent evidence that oxidative changes have occurred. No one had suspected that in spite of the history of acid oils and the presence of black oxidized acids therein, the essential fatty acid content remained very high, in fact approximating those of the limpid mother oils. The discovery that the acid oils contained such high contents of the essential fatty acids was unexpected and surprising. Table II sets forth analyses of acid oils that attest to this surprising discovery.

TABLE II

*Essential fatty acid content of acid oils in relation to that of the mother oils*

| Oil | Linoleic Acid, Percent | Linolenic Acid, Percent |
|---|---|---|
| Limpid cottonseed oil | 48 | 0 |
| Cottonseed acid oil | 42 | 0 |
| Limpid soybean oil | 54 | 8 |
| Soybean acid oil | 49 | 6 |
| Limpid corn oil | 52 | 0 |
| Corn acid oil | 47 | 0 |
| Limpid peanut oil | 24 | 0 |
| Peanut acid oil | 22 | 0 |

The foregoing analyses were carried out spectrophotometrically on the alkali isomerized acid oils. Alkali isomerization causes the double bonds in the fatty acids to migrate into conjugated positions resulting in compounds which absorb light in the ultra-violet region of the spectrum [Brice et al., Journal of the American Oil Chemists' Society, vol. 29, p. 279 (1952)]. Biological assays in accordance with the method of Reiser [Journal of Nutrition, vol. 42, p. 319 (1950)], involving supplementation of a fat-free diet with 3 percent of the acid oils indicate that the acid oils are as effective as mother oils in preventing essential fatty acid deficiency (poor growth and high mortality). A supplement of 1 percent of the cottonseed, soya bean or corn oil, or the corresponding acid oils was effective to a partial degree in overcoming essential fatty acid deficiency. Peanut oil and peanut acid oil had to be fed at twice the level of the other oils to give similar results.

In feeding tests conducted with commercial mashes containing 4 percent of residual vegetable oils, extended over a period of ten weeks, the 3 percent supplement of acid oils did not improve growth or survival. However, feed efficiency was improved by 4 to 5 percent; feed efficiency for the commercial mash being 2.75, and that for the supplemental mashes being 2.61-2.64. That finding indicates that sufficient essential fatty acids were present in the commercial mash, and that the acid oil supplement serves merely as a concentrated source of calories and as a suppressor of dustiness. In no case involving acid oil supplementation of feeds was there evidence of poor carcass quality or carcass composition. The flavor of the cooked birds that had subsisted on the acid oil-supplemented ration was the same as that of the cooked control birds. These studies show that acid oils are as effective as limpid vegetable oils in supplying essential fatty acids, and that the effectiveness of the acid oils as a source of the essential fatty acids manifests itself only when the residual vegetable oil content of the ration is below a critical level of about 2.5 percent. In rations containing 4 percent or more of residual vegetable oil, acid oil supplementation is of no more value than tallow since the acid oil serves merely as a source of calories.

It was also discovered in the course of the studies that led to the instant invention that the acid oil when applied to the feeds in the form of a spray is, surprisingly, very stable (resistant to peroxide development) and does not become rancid on feeds despite long holding periods. These conclusions are supported by the data in Tables III and IV.

TABLE III

*Peroxide development in acid oils in relation to that developing in the mother oils*

| Oil | Iodine Value | A. O. M. Stability Value,[1] hours | Peroxide Value after 100 Hours Aeration at 98° C. me./kilo |
|---|---|---|---|
| Limpid cottonseed oil | 109 | 12 | 120 |
| Cottonseed acid oil | 105 | More than 100 | 22 |
| Limpid soybean oil | 130 | 8 | 120 |
| Soybean acid oil | 125 | More than 100 | 13 |
| Limpid corn oil | 121 | 10 | 120 |
| Corn acid oil | 117 | More than 100 | 17 |
| Limpid peanut oil | 93 | 24 | 120 |
| Peanut acid oil | 94 | More than 100 | 15 |

[1] Method of King et al., Oil and Soap, vol. 10, p. 105 (1933) as modified by Riemenschneider et al., Oil and Soap, vol. 20, p. 169 (1943).

TABLE IV

*Peroxide development in feeds before and after having been sprayed with 2.5 percent acid oils*

| | Peroxide Value of Oil Extracted from Feed Stored at 45° C. | | |
|---|---|---|---|
| | 0 Days, me./kilo | 10 Days, me./kilo | 21 Days, me./kilo |
| Commercial[1] (3.2 percent residual vegetable oil) | 5.2 | 16.2 | 18.8 |
| Same feed + 2.5 percent cottonseed acid oil | 6.5 | 8.0 | 9.2 |
| Same feed + 2.5 percent soybean acid oil | 6.6 | 9.1 | 12.0 |
| Same feed + 2.5 percent corn acid oil | 6.9 | 9.2 | 11.5 |
| Same feed + 2.5 percent peanut acid oil | 6.2 | 8.4 | 10.6 |

[1] Balanced commercial feed of 24 percent protein content considered to be completely adequate for the growing chick.

In carrying out the tests tabulated in Table IV, 100 gram quantities of a commercial mash were sprayed with 2.5 percent of acid oils and each of the treated materials was transferred as a layer to the bottom of a 4 liter loosely-capped bottle. The assembly was stored at 45° C. Storage for three weeks under these conditions is equivalent to storage for six months at room temperature. However, when vitamin A is added (in the form of a fish liver oil of 200,000 U. S. P. units per gram) to the acid oils to yield 175 units per gram (2000 units per lb. of feed), the vitamin A retention of the supplemented feed is very poor; 90 percent loss after two weeks storage at 45° C. These results, contrary to prior teachings that vitamin A destruction parallels the rise in peroxide value of the vitamin carrier (Dyme et al., Iowa State College Journal of Science, vol. 15, p. 189, 1941; Halpern, Industrial and Engineering Chemistry, Analytical Edition, vol. 18, p. 621, 1946; Buxton, Industrial and Engineering Chemistry, vol. 39, p. 225, 1947; Dassow et al., Journal of the American Oil Chemists' Society, vol. 26, p. 475, 1949) emphasize that acid oils alone cannot be employed to impart to feeds all the nutritional advantages inherent in fats.

Since vitamin E (the tocopherols) is also an antioxidant, being even more vulnerable than vitamin A to oxidation, it could not be added to the acid oil with the expectation that potency thereof would be retained during storage of the feed. As a source of vitamin E, I have used another by-product of the vegetable oil industry. This by-product, called "hot-well oil," is the water-insoluble portion of the condensate obtained in the deodorization of vegetable oils by high-vacuum steam-distillation. Colorimetric analyses [Rawlings, Oil and Soap, vol. 21, p. 257, (1944)] show that hot well oil contains from 5 to 7 percent of tocopherols. Since the tocopherols vary in vitamin E potency, and since the colorimetric method is not specific for individual tocopherols, I investigated the vitamin E content of hot-well oil by biological assay thereof. The biological assay is dependent upon a measure of reproductive performance, using rats as test animals [Harris et al., Journal of Biological Chemistry, vol. 179, p. 1111 (1949)], I found that the unmodified hot-well oil has true vitamin E activity of about 2000 international units per 100 grams, equivalent to about 1.5 grams percent as d-alpha-tocopherol-acetate.

In my pending application, Ser. No. 459,616, filed October 1, 1954, it is shown that hot-well oil (the raw material without modification whatever), stabilizes vitamins A and D in a fat carrier provided the fat is highly hydrogenated. Acid oils cannot be hydrogenated. In searching for a low-cost satisfactory carrier for the vitamin E (in the form of hot-well oil), I discovered that hydrogenated animal fats of feed-grade quality (so-called inedible tallow and/or grease) are excellent vehicles provided they are hydrogenated to a melting point of 52° C. or higher. The hot solution of vitamin E (as hot-well oil) in the molten hydrogenated tallow is either spray-chilled, flaked from a chill-roll, or allowed to set up and then ground to yield small discrete particles. I discovered that hot-well oil, as the sole additive to these hydrogenated fats, is a powerful antioxidant that protects the labile constituents therein from oxidation. As shown in my aforesaid pending application, Ser. No. 459,616, the hot-well oil is very effective in protecting vitamin A in a hydrogenated tallow against oxidative deterioration.

I have further found that when added to the hydrogenated animal fats in concentrations up to 10 percent, the hot-well oil has a remarkable influence in protecting the unsaturated fatty acids present against oxidation (peroxide development). The tocopherol retention is also very good. After storage for three weeks at 45° C. under freely circulating air, peroxide values were less than 5 milliequivalents per kg. (10 percent hot-well oil in hydrogenated grease of 56° C. melting point), and the initial tocopherol content of 0.7 percent was fully retained.

If it be desired to add vitamin A and/or D to the hydrogenated animal fat or grease, supplemented with hot-well oil, this may be done to good advantage.

As shown in my aforesaid pending application, Ser. No. 459,616, vitamin A is remarkably stabilized by the addition of 1 percent of hot-well oil to completely hydrogenated tallow, although not quite to the same extent as when the vehicular fat is completely hydrogenated soya bean oil. Since then, I have discovered that the vitamin A in the hydrogenated tallow, supplemented with hot-well oil, can further be stabilized by reducing the concentration of the vitamin A in the fat carrier. Thus, when the hydrogenated tallow with 5 percent hot-well oil as the only antioxidant supplement was used as a carrier for the vitamin A to furnish 250 U. S. P. units of vitamin A per gram, fully 85 percent of the vitamin A was retained after the accelerated storage test. In contrast, when the potency was 25,000 U. S. P. units of vitamin A per gram, vitamin A retention was 43 percent. The accelerated holding test involved storage of the vitamin A in fat particles on a mineral mixture (1+9), the mineral mixture containing about 2000 parts of iron per million and about 300 parts of copper per million. The mixture was exposed to air freely circulating within the incubator held at 45° C. for a period of 6 weeks. Analyses for vitamin A content were conducted in accordance with the U. S. P. XIV spectrophotometric and colorimetric methods. The test samples were handled according to the same procedures described in my aforesaid pending application, Ser. No. 459,616. That procedure involves distributing one part of the particles of fat containing the vitamin A in nine parts of a mineral mixture having the following composition:

| | Grams |
|---|---|
| Manganese sulfate, $MnSO_4H_2O$ | 74 |
| Potassium iodide, Ki | 6 |
| Ferrous sulfate, $FeSO_4.4H_2O$ | 73 |
| Copper sulfate, $CuSO_4.5H_2O$ | 11 |
| Zinc sulfate, $ZnSO_4.7H_2O$ | 4 |
| Cobalt sulfate, $CoSO_4.H_2O$ | 0.6 |
| Calcium carbonate, q. s. 20 pounds. | |

The mixture was stored as a thin layer at 45° C. exposed to the freely circulating air within the incubator. Seven days storage under the foregoing conditions is equivalent to nine weeks storage at room temperature.

The desirable low level of about 250 U. S. P. units of vitamin A per gram, or a low multiple thereof, is ideal when the fat carrier is intended not only to serve as a carrier of vitamin A, but also as a source of calories, i. e., representing a significant addition of fat to the feed.

Since hot-well oil is a distillate obtained as a by-product in the deodorization of vegetable oil and thereby represents a tremendous concentration of the objectionably odoriferous materials present in crude vegetable oils, it could never be used as such for the supplementation of food products prepared for human consumption. For the same reason, feed manufacturers have been opposed to the inclusion of hot-well oil in feeds for animal consumption. Not only was there a belief that hot-well oil, if added to animal feeds, might interfere with the feed consumption but also that the flavor might carry through into the tissues of the animals. Despite vigorous attempts by producers of hot-well oil to arouse the interest of the feed industry in this product, the opposition against the use thereof for the reasons above set forth prevented its acceptance.

Before scheduling large scale testing and practical evaluations of the advantages of supplementing feeds with hot-well oil, I had to satisfy myself that the fear of the feed manufacturers, above set forth, was unfounded. Tests conducted on chickens subsisting on rations containing 1 percent of hot-well oil showed that no adverse flavors were imparted to the tissues of the test birds as compared with control birds (subsisting on the same diet, but without the added hot-well oil) when cooked and subjected to a flavor panel. This level of hot-well oil in the ration is from 5 to 100 times the quantity thereof which is to be used as a feed supplement as a source of vitamin E. Hydrogenated animal fat with added hot-well oil will be added to feeds in concentrations of from 1 to 5 percent. This component will contain sufficient hot-well oil to furnish a minimum of 2000 international units of vitamin E per ton of feed (100 grams of hot-well oil, or 0.01 percent of the ration) and a maximum of 40,000 international units (2000 grams of hot-well oil, or 0.2 percent of the ration). Such variations in vitamin E content are due to variable requirements in feeds, dependent upon whether the feeds is designed for broilers, breeders, or turkeys (progressively higher requirements). Hot well-oil concentration in the hydrogenated animal fat will vary from as little as 0.2 percent to as much as 24 percent, dependent upon the levels of the hydrogenated animal fat and vitamin E desired in the ration.

Another important factor which had to be fully evaluated in this novel approach to fat supplementation of feeds was the physiological availability of the hydrogenated fat. Farm animals ordinarily do not ingest hydrogenated fats of melting points above 52° C. The feeds heretofore used contained residual limpid vegetable oils in about 5 percent concentration; and these residual oils are readily digested and absorbed. As has been stated above, in recent years, due to the rapid growth of solvent extraction methods in processing vegetable seeds, poultry feeds contain less residual vegetable oils, about 3 percent currently, and this content is still decreasing.

Fat which is unabsorbed by the chicken (not physiologically available) is found in the excreta. Two basal diets were employed in this study, and various fat supplements were added thereto. The droppings from the chickens at the end of seven days and at the end of seventy days subsisting on the rations were analyzed for total solids and for total fat content. The latter included also unabsorbed fatty acids as such and as soaps (ether extraction of the acidified material). To correct for variable moisture content of the droppings, the fat values were calculated on the "total solids" basis. Results of this study are summarized in Table V.

TABLE V

*Physiological availability to the chicken [1] of the fat in poultry rations*

| Ration | | Extra Fat Supplement | Fat Present in Ration, Percent | Analyses of Droppings | | | | | |
|---|---|---|---|---|---|---|---|---|---|
| | | | | Birds—7 days old | | | Birds—70 days old | | |
| Type | No. | | | Total Solids (T. S.), Percent | Fat, Percent | Fat on T. S. Basis, Percent | Total Solids (T. S.), Percent | Fat, Percent | Fat on T. S. Basis, Percent |
| Commercial [2] | 1 | None | 3.2 | 70.8 | 2.04 | 2.88 | 25.3 | 0.82 | 3.24 |
| | 2 | 5% Tallow, M. P.=45° C | 8.2 | 66.3 | 1.97 | 2.97 | 27.8 | 0.84 | 3.32 |
| | 3 | 5% Hydrogenated tallow beads, M. P.=58° C | 8.2 | 64.3 | 2.38 | 3.70 | 23.3 | 0.95 | 4.07 |
| | 4 | 5% Hydrogenated tallow beads, M. P.=58° C; beads containing 5% hot-well oil and 3% lecithin | 8.2 | 69.6 | 2.01 | 2.89 | 24.3 | 0.76 | 3.12 |
| Fat-Free [3] | 5 | None | 0.0 | 68.7 | 1.66 | 2.42 | No survivors. | | |
| | 6 | 5% Tallow, M. P.=45° C | 5.0 | 67.3 | 2.62 | 3.90 | No survivors. | | |
| | 7 | 5% Hydrogenated Tallow beads, M. P.=58° C | 5.0 | 68.2 | 3.08 | 4.52 | No survivors. | | |
| | 8 | 5% Hydrogenated tallow beads, M. P.=58° C; beads containing 5% hot-well oil and 3% lecithin | 5.0 | 66.0 | 2.61 | 3.96 | No survivors. | | |
| | 9 | 3% Soybean acid oil | 3.0 | 70.3 | 1.84 | 2.62 | 28.2 | 0.77 | 2.73 |
| | 10 | 3% Soybean acid oil+5% tallow, M. P.=45° C | 8.0 | 73.2 | 1.98 | 2.71 | 22.4 | 0.66 | 2.94 |
| | 11 | 3% Soybean acid oil+5% hydrogenated tallow beads, M. P.=58° C | 8.0 | 68.4 | 2.61 | 3.82 | 26.4 | 1.06 | 4.02 |
| | 12 | 3% Soybean acid oil+5% hydrogenated tallow beads, M. P.=58° C.; beads containing 5% hot-well oil and 3% lecithin | 8.0 | 67.5 | 1.78 | 2.64 | 25.6 | 0.71 | 2.77 |

[1] 20 one day old White Rock chicks (Robert's Strain) in a group.
[2] Balanced commercial ration of 24 percent protein content considered to be completely adequate for growing chick.
[3] Basal fat-free ration as described by Reiser, Journal of Nutrition, vol. 42, p. 319 (1950).

From the data of Table V, the following conclusions are justified. The completely hydrogenated tallow particles, containing hot-well oil and an edible emulsifying agent (lecithin) are as readily digested and absorbed as unhydrogenated tallow sprayed on the commercial feed. When either of those fat supplements is added to the commercial ration containing about 3 per cent of residual vegetable oil, complete absorption is obtained (no increase of fat in the droppings). Completely hydrogenated tallow is utilized to a lesser extent. All these fat supplements are utilized less efficiently when added to the fat-free ration (increased excretion of fat, calculated on a total solids basis over the endogenous excretion, that are noted when no fat supplements are present in the ration). However, when acid oil in 3 percent concentration is added to the fat-free ration, effective utilization of the completely hydrogenated tallow containing hot well oil and lecithin is noted. The hydrogenated tallow alone is not as effectively utilized under these conditions.

The above findings may be explained according to the following hypothesis. Lecithin, the emulsifying agent, is known to contribute to the biological utilization of high melting fats, i. e., those melting above 52° C. Other emulsifying agents, such as the monoglycerides, polyoxyethylene derivatives of fatty acids, fatty acid esters of sorbitan, and polyoxyethylene derivatives of said esters are equally satisfactory. However, in the absence of a low-melting fat in the digestive tract (the residual vegetable oils in the feed and/or added vegetable acid oils), the emulsifying agent alone is of limited effectiveness. I surmise that the lower melting fatty acids in the digestive tract facilitate the solubilization of the high melting fatty acids; and that this factor in conjunction with the action of the emulsifier results in the complete absorption of the fatty acids derived from the completely hydrogenated tallows. I have found no advantage in using more than 20 percent of any of the emulsifiers aforesaid. In supplementing a feed, a minimum of 1 percent of acid oil is sprayed on the feed. That addition serves as a source of calories and controls dustiness in a feed that contains 4 percent or more of residual vegetable oil. As the residual vegetable oil content of a feed decreases, the acid oil supplement is progressively increased up to 4 and possibly 5 percent in the case of fat-free rations. In such rations, the acid oil serves the additional function of protecting the animals against essential fatty acid deficiency. The hydrogenated animal fat of melting point above 52° C., and containing hot-well oil and emulsifier, is added as discrete particles in concentrations of from 1 to 5 percent. The ratio of one type of fat to the other (added oil on the one hand and hydrogenated tallow on the other) in the aforesaid combination (required for imparting to feeds all the nutritional advantages inherent in fats) may vary from 1:5 to 5:1 (acid oil: hydrogenated animal fat), with the total fat supplement ranging from 2 to 10 percent of the feed.

The studies, as set forth in Table V, demonstrate the need for essential fatty acids in the diet of the chick. None of the birds on the fat-free diet, before or after supplementation with tallow (unhydrogenated and hydrogenated) survived the 70-day test period.

The advantage of combining the aforesaid two types of fat supplements in feeds is shown by growth and feed efficiency studies. One-day old White Rock chicks (Roberts strain) were used; 150 males and 150 females in each test group on the commercial ration and 15 males and 15 females in each test group on the fat-free ration, without and with fat supplements. The groups subsisted on the same test rations, Nos. 1–4 with Nos. 9–12 described in Table V, with the exception that the tallow supplements were incorporated in 2.0 percent concentration in rations. In addition, the tallow supplement contained 120,000 U. S. P. units of vitamin A and 40,000 AOAC units of vitamin $D_3$ per lb., and as antioxidants 0.2 percent of a mixture of equal parts of butylated hydroxyanisole and butylated hydroxytoluene.

The unhydrogenated tallow was sprayed on the feed, while the hydrogenated tallow supplements were added as discrete particles to the feed. The period of the test was the first ten weeks of life. The results of this study are summarized in Table VI.

TABLE VI

*Value of the two types of fats used collectively as supplements for imparting to feeds all the nutritional advantages inherent in fats.*

| Ration No.[1] | Sex of Birds | Average Wt. of Birds, pounds | Avg. Feed Consumed, pounds | Feed Efficiency Found [2] | Relative |
|---|---|---|---|---|---|
| 1 | M | 3.19 | 8.32 | 2.60 | |
|   | F | 2.64 | 7.52 | 2.85 | |
|   | Both | 2.915 | 7.920 | 2.725 | 100.00 |
| 2 | M | 3.18 | 7.92 | 2.49 | |
|   | F | 2.67 | 6.94 | 2.60 | |
|   | Both | 2.925 | 7.430 | 2.545 | 94.4 |
| 3 | M | 3.12 | 8.36 | 2.68 | |
|   | F | 2.61 | 7.62 | 2.92 | |
|   | Both | 2.865 | 7.990 | 2.800 | 102.8 |
| 4 | M | 3.45 | 8.18 | 2.37 | |
|   | F | 2.72 | 6.75 | 2.48 | |
|   | Both | 3.035 | 7.465 | 2.425 | 89.0 |
| 9 | M | 3.01 | 8.14 | 2.70 | |
|   | F | 2.48 | 7.40 | 2.98 | |
|   | Both | 2.745 | 7.770 | 2.840 | 100.0 |
| 10 | M | 3.02 | 8.02 | 2.65 | |
|   | F | 2.52 | 7.29 | 2.89 | |
|   | Both | 2.770 | 7.655 | 2.770 | 97.5 |
| 11 | M | 2.84 | 8.33 | 2.93 | |
|   | F | 2.41 | 7.61 | 3.16 | |
|   | Both | 2.625 | 7.970 | 3.045 | 107.2 |
| 12 | M | 3.23 | 8.04 | 2.48 | |
|   | F | 2.64 | 7.07 | 2.68 | |
|   | Both | 2.935 | 7.555 | 2.580 | 90.8 |

[1] These rations correspond to those of like number in Table V, with modifications described in the text.
[2] Ratio of feed consumed to weight of bird.

Table VI shows that hydrogenated tallow plus hot-well oil plus lecithin (ration 4) improves feed efficiency to a greater degree than the supplement of unhydrogenated tallow (ration 2). The birds on ration 4 grew at a faster rate and showed better feed efficiency, while those on ration 2 showed only improved feed efficiency. Calculations indicate that 89.0 parts of ration 4 are equivalent nutritionally to 94.4 parts of ration 2; and that the latter in turn is equivalent to 100 parts of ration 1, the basal commercial ration. Hydrogenated tallow is a poor dietary fat supplement, 102.8 parts of ration 3 being equal to 100.0 parts of the basal unsupplemented ration.

The same general picture is obtained in evaluating the responses to rations 9–12. The findings also showed that the acid oil supplement is as effective as residual oil present in commercial feeds in preventing an essential fatty acid deficiency. When it is considered that the basal fat free diet in rations 9–12 is an artificial semi-synthetic ration, the agreement of results obtained for the chicks on basal rations 1 and 9 is surprisingly good.

In preparing the examples and the controls listed in Tables V and VI, the following methods were used:

The emulsifier, when added, consisted of 3 percent commercial lecithin derived from soya bean oil. The fatty beads were made by heating the hydrogenated tallow to a temperature of about 10° C. above its melting point, the lecithin was added, and also the hot well oil, when used, added thereto. The heated solution of the hydrogenated tallow with the additives was spray-chilled to yield small beads predominantly 20 to 60 mesh in size.

The rations were prepared by spraying them with 3 percent soya bean acid oil in cases where the acid oil was added. The beads of the hydrogenated tallow were mixed with the sprayed rations, in the percentage indicated in all the various compositions set forth by distributing them uniformly in the rations.

It will be understood that the foregoing description of the invention and the examples set forth are merely illustrative of the principles thereof. Accordingly, the appended claims are to be construed as defining the invention within the full spirit and scope thereof.

I claim:

1. As a supplement for feeds containing less than about 3 percent residual native vegetable oil, the combination of vegetable acid oil and particles of hydrogenated animal fat having a melting point of at least 52° C. and containing unprocessed raw hot well oil.

2. A composition comprising a feed stuff, a vegetable acid oil, and particles of hydrogenated animal fat having a melting point of at least 52° C., the latter containing unprocessed raw hot well oil.

3. A ration for animal nutrition comprising the combination of a feed stuff, vegetable acid oil, and particles of hydrogenated animal fat having a melting point of at least 52° C., the said particles containing unprocessed raw hot well oil and an emulsifier.

4. A composition for use in animal nutrition comprising the combination of a feed stuff, vegetable acid oil distributed on said feed stuff, and particles of hydrogenated animal fat having a melting point of at least 52° C. and containing unprocessed raw hot well oil and an emulsifier.

5. A ration for animal nutrition comprising the combination of a feed stuff, vegetable acid oil distributed on said feed stuff, and particles of hydrogenated animal fat having a melting point of at least 52° C., the said particles containing unprocessed raw hot well oil and an emulsifier, the ratio of the acid oil to the said particles ranging from 1:5 and 5:1 respectively, and the total of acid oil and the particles constituting from 2 to 10 per cent by weight of the ration.

6. A ration for animal nutrition comprising a feed stuff, vegetable acid oil, and particles of hydrogenated animal fat having a melting point of at least 52° C., the said particles containing unprocessed raw hot well oil in an amount of approximately from 0.2 to 24 per cent.

7. A ration for animal nutrition substantially supplemented by vegetable acid oil and particles of hydrogenated animal fat containing raw unprocessed hot well oil.

8. Method of supplementing a ration for animal nutrition which comprises distributing vegetable acid oil on the dry ration and blending the thus-treated ration with particles of hydrogenated animal fat of a melting point of at least 52° C. and containing unprocessed raw hot well oil.

References Cited in the file of this patent

UNITED STATES PATENTS

| | | |
|---|---|---|
| 2,349,269 | Hickman | May 23, 1944 |
| 2,363,672 | Jakobsen | Nov. 28, 1944 |
| 2,504,159 | Singer et al. | Apr. 18, 1950 |

FOREIGN PATENTS

| | | |
|---|---|---|
| 481,441 | Canada | Mar. 4, 1952 |

OTHER REFERENCES

Kraybill: Journal of American Chemists' Society, 31, 11, pages 538–542, November 1954.